United States Patent
McClendon

(10) Patent No.: US 10,432,498 B1
(45) Date of Patent: Oct. 1, 2019

(54) LOCATION PRIVACY AGGREGATION TESTING

(71) Applicant: Google LLC, Mountain View, CA (US)

(72) Inventor: Brian McClendon, Portola Valley, CA (US)

(73) Assignee: Google LLC, Mountain View, CA (US)

(*) Notice: Subject to any disclaimer, the term of this patent is extended or adjusted under 35 U.S.C. 154(b) by 1039 days.

(21) Appl. No.: 14/178,690

(22) Filed: Feb. 12, 2014

(51) Int. Cl.
*H04L 12/26* (2006.01)

(52) U.S. Cl.
CPC ............ *H04L 43/16* (2013.01); *H04L 43/062* (2013.01)

(58) Field of Classification Search
USPC .......................................................... 709/224
See application file for complete search history.

(56) References Cited

U.S. PATENT DOCUMENTS

| | | | | |
|---|---|---|---|---|
| 6,308,273 B1 * | 10/2001 | Goertzel | ............. | G06F 21/6218 726/2 |
| 7,813,875 B2 * | 10/2010 | Yamamoto | .............. | G01S 19/09 701/484 |
| 7,827,605 B2 | 11/2010 | Lyle et al. | | |
| 8,112,100 B2 * | 2/2012 | Frank | ................. | G06Q 10/1095 455/414.2 |
| 8,621,653 B2 * | 12/2013 | Khosravy | ........... | G06F 21/6227 340/8.1 |
| 2008/0018927 A1 * | 1/2008 | Martin | .................... | G06F 21/74 358/1.15 |
| 2008/0261626 A1 * | 10/2008 | Farazmandnia | ...... | G01S 5/0027 455/456.5 |
| 2012/0313777 A1 * | 12/2012 | Zazula | ................. | G06Q 10/109 340/539.13 |
| 2013/0097587 A1 | 4/2013 | Lopian | | |

OTHER PUBLICATIONS

Chow et al., "Faking Contextual Data for Fun, Profit, and Privacy", WPES'09, Nov. 9, 2009, Chicago, Illinois, USA, <http://www.parc.com/content/attachments/FakingContextualData-WPES-09.pdf>.

(Continued)

*Primary Examiner* — Umar Cheema
*Assistant Examiner* — John Fan
(74) *Attorney, Agent, or Firm* — Lerner, David, Littenberg, Krumholz & Mentlik, LLP

(57) ABSTRACT

Aspects provide methods, systems, and recording mediums for determining compliance with a location data protocol including a threshold minimum number of location data reports by users. As an example, fictitious user data including a set of locations may be generated. The set of locations may include at least one location that does not meet the threshold minimum number of location data reports by users of the location data protocol. The fictitious user data may be provided to a location data processing system that processes user location data and outputs output data including a list of locations. The output data is received and used to determine whether the at least one location is included in the list of locations. When the at least one location is included in the list of locations, it may be determined that the location data processing system has not complied with the location data protocol.

14 Claims, 7 Drawing Sheets

(56) References Cited

OTHER PUBLICATIONS

Chow et al., "Privacy in Location-based Services: A System Architecture Perspective", vol. 1, Issue 2, Jul. 2009, pp. 23-27, <http://www-users.cs.umn.edu/~mokbel/papers/sigspatial09.pdf>.

Popa et al., "Privacy and Accountability for Location-based Aggregate Statistics", CCS'11, Oct. 17-21, 2011, Chicago, Illinios, USA, <http://www.math.utexas.edu/users/blumberg/privaggs.pdf>.

Reed, Brad, "New Android mod protects privacy by feeding apps fake data", Jun. 12, 2012, <http://news.yahoo.com/android-mod-protects-privacy-feeding-apps-fake-data-160009054.html>.

* cited by examiner

LOCATION PRIVACY AGGREGATION TESTING

BACKGROUND

Various systems such as navigation tools, advertising, games, social media applications etc. may provide location based services. As an example, a user may provide permission for a particular system or application to receive location data from the user's client computing device in order to utilize the location based services. Some systems may treat location data so that the data is not tied to a particular user and then use aggregated location data to provide better services to the user.

SUMMARY

When implementing a system that uses aggregated location data, a testing protocol can be used to evaluate results of the aggregation process. Aspects of the disclosure provide a method for determining compliance with a location data protocol including a threshold minimum number of location data reports by user, with the threshold representing a minimum number of location reports that must correspond a location before location data from the location is to be used in an aggregation process. The method includes generating, by one or more computing devices, fictitious user data including a set of locations. The set of locations includes at least one location that does not meet the threshold minimum number of location data reports by users of the location data protocol. The method also includes providing, by the one or more computing devices, the fictitious user data to a location data processing system that processes user location data corresponding to locations visited by users and outputs output data including a list of locations; receiving, by the one or more computing devices, the output data; determining, by the one or more computing devices, whether the at least one location is included in the list of locations of the received output data; and when the at least one location is included in the list of locations, determining, by the one or more computing devices, that the location data processing system has not complied with the location data protocol.

In one example, the method also includes generating a notification when the at least one location is included in the list of locations indicating that location data processing system has not complied with the protocol and providing the notification for display. In another example, the method also includes sending instructions to the location data processing system to stop further processing of user location data. In another example, providing the fictitious user data to a location data processing system includes storing the fictitious user data in a storage system with other user location data, the storage system being accessible by the location data processing system.

Other aspects of the disclosure provide a system for determining compliance with a location data protocol including a threshold minimum number of location data reports by users. The system includes one or more computing devices. These one or more computing devices are configured to generate fictitious user data including a set of locations. The set of locations including at least one location that does not meet the threshold minimum number of location data reports by users of the location data protocol. The one or more computing devices are also configured to provide the fictitious user data to a location data processing system that processes user location data corresponding to locations visited by users and outputs output data including a list of locations; receive the output data; determine whether the at least one location is included in the list of locations of the received output data; and when the at least one location is included in the list of locations, determine that the location data processing system has not complied with the location data protocol.

In one example, the one or more computing devices are also configured to generate a notification when the at least one location is included in the list of locations indicating that location data processing system has not complied with the protocol and provide the notification for display. In another example, the one or more computing devices are also configured to send instructions to the location data processing system to stop further processing of user location data. In another example, the one or more computing devices are distinct from the location data processing system. In another example, the one or more computing devices are incorporated into the location data processing system. In another example, the one or more computing devices are also configured to provide the fictitious user data to a location data processing system by storing the fictitious user data in a storage system with other user location data, the storage system being accessible by the location data processing system.

Further aspects of the disclosure provide a non-transitory, tangible computer readable medium on which instructions are stored. The instructions, when executed by one or more processors, cause the one or more processors to perform a method for determining compliance with a location data protocol including a threshold minimum number of location data reports by users. The method includes generating fictitious user data including a set of locations. The set of locations including at least one location that does not meet the threshold minimum number of location data reports by users of the location data protocol. The method also includes providing the fictitious user data to a location data processing system that processes user location data corresponding to locations visited by users and outputs output data including a list of locations; receiving the output data; determining whether the at least one location is included in the list of locations of the received output data; and when the at least one location is included in the list of locations, determining that the location data processing system has not complied with the location data protocol.

In one example, the method also includes generating a notification when the at least one location is included in the list of locations indicating that location data processing system has not complied with the protocol and providing the notification for display. In another example, the method also includes sending instructions to the location data processing system to stop further processing of user location data. In another example, providing the fictitious user data to a location data processing system includes storing the fictitious user data in a storage system with other user location data, the storage system being accessible by the location data processing system.

DETAILED DESCRIPTION

Overview

Figure 1:
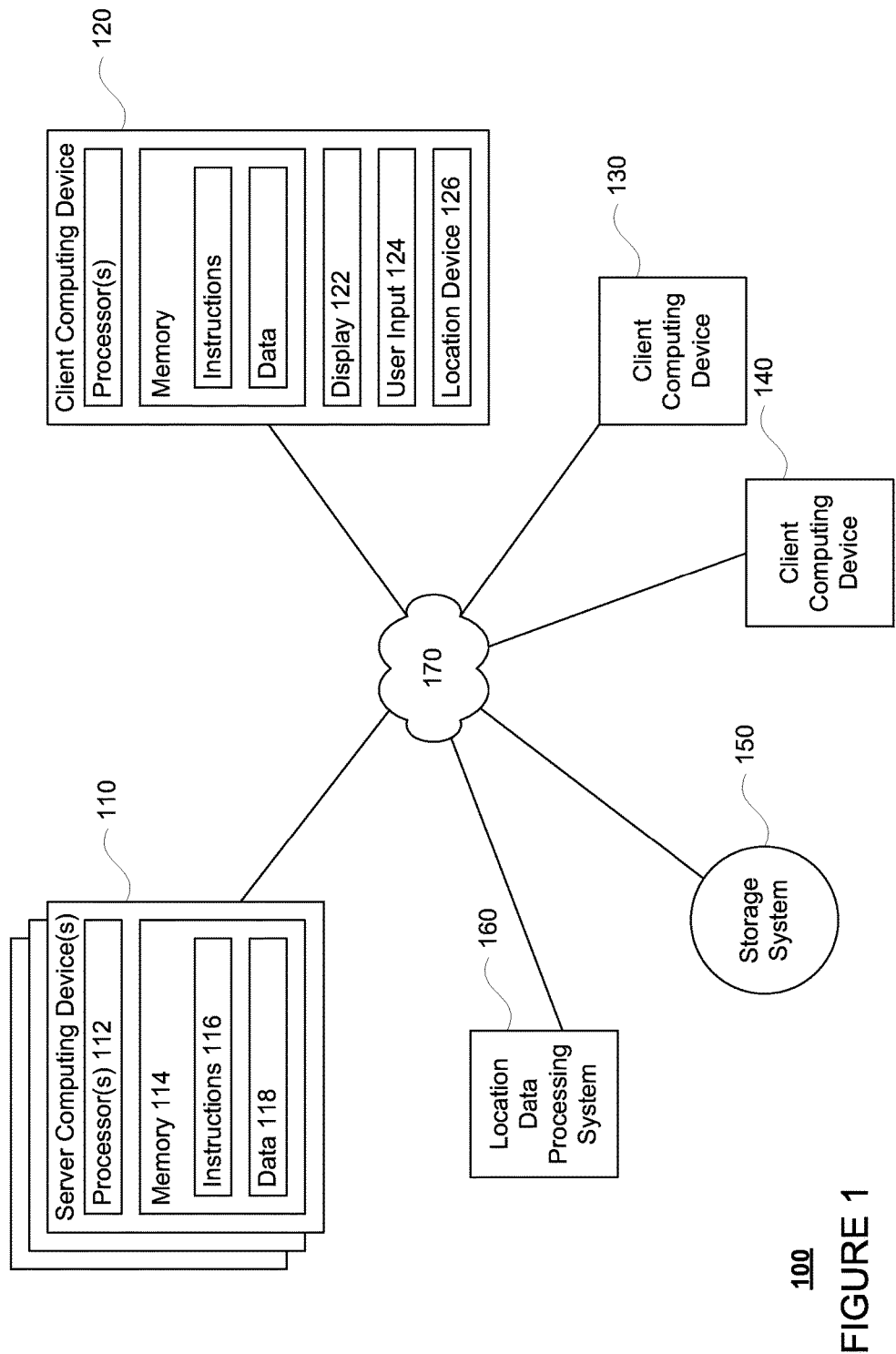
FIG. 1 is a functional diagram of an example system in accordance with aspects of the disclosure.

The technology relates generally to testing compliance with location data protocols in order to protect the privacy of user location data. Location based services may provide users with various useful information and services based on the user's location. For example, a user may opt to allow a navigation application to collect information about the location of the user's mobile computing device (such as a phone or tablet) in order to provide useful and accurate location based services. In some examples, the user's location data may be collected, anonymized, and processed by various back end computing systems that process anonymized user location data in order to improve these location based services. For instance, these back end computing systems may output lists of locations and their relative popularity. Even when the data is anonymized and stored securely, additional protections may be implemented in order to further protect user privacy. In addition, these protections may be tested at various times, including prior to the use of real user location data, in order to ensure that these protections are working to prevent disclosure of a user's location history to other users.

As an example, the various backend computing systems may be required to follow specific protocols in order to use even anonymized location data. This may include, for example, only using data collected at a particular location when that particular location has been visited a threshold minimum number of location data reports. As an example, if the threshold minimum number of location data reports is 50 and anonymized location data has been collected at a location (or within some reasonable distance of that location such as 10 or 25 meters, etc.) less than 50 times, the backend computing system may be prevented from using the anonymized location data for that particular location.

As noted above, a testing scheme may be utilized in order to help avoid inadvertent use of anonymized location data contrary to the privacy protocols. In one example of a testing scheme, a set of fictitious users may be generated. These fictitious users may each be associated with a set of locations. At least one of these locations may be chosen to correspond to a remote or highly unpopular location, or rather, a location where users are unlikely to be providing location data from their mobile computing devices. Examples of such locations may include a location within an ocean, a large lake, a desolate area such as a remote desert or forest, etc. Even if "real" users were to visit these remote locations and provide location data, it would be very unlikely that there would be enough users to meet the threshold minimum number of location data reports of the protocols described above.

The output lists from the back end computing systems may then be processed by one or more computing devices to determine whether any remote location of the fictitious users is included. If not, then the system may determine that the protocols are being observed. However, if these locations are included, the one or more testing computing device may determine that the protocol was not observed. In other words, if a remote location is in an output list, it is highly likely that the back end computing system used the location data for a location which had not had the threshold minimum number of location data reports. If this is the case, it is possible that the back end computing system has been implemented in a way that uses location data contrary to the protocols in at least some instances. Thus, the testing computing device may notify an administrator, a person responsible for reviewing such notifications, that further work is needed before deploying a back end computing system. For a back end computing system that is already in production, the testing computing device or devices may shut down the computing system that has not passed the test.

Example Systems

Figure 2:
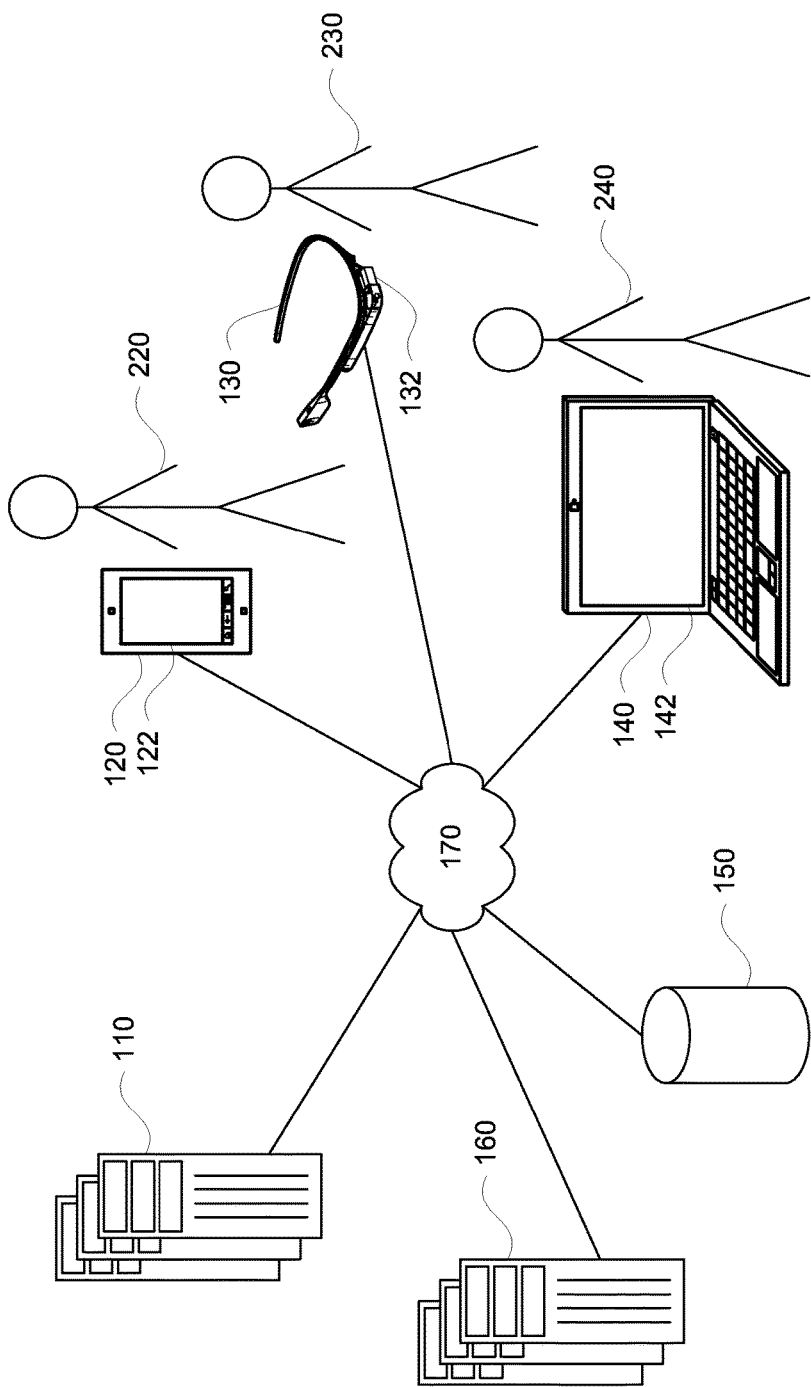
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, 140, and 160 as well as storage system 150. The one or more computing devices 110 can contain one or more processors 112, memory 114 and other components typically present in general purpose computing devices. Memory 114 of computing devices 110 can store information accessible by the one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as a commercially available CPU. Alternatively, the processor can be a dedicated component such as an ASIC or other hardware-based processor. Although not necessary, computing devices 110 may include specialized hardware components to perform specific computing processes, such as decoding video, matching video frames with images, distorting videos, encoding distorted videos, etc. faster or more efficiently.

Although FIG. 1 functionally illustrates the processors, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in a housing different from that of computing devices 110. Accordingly, references to a processor, computer, computing device, or memory will be understood to include references to a collection of processors, computers, computing devices, or memories that may or may not operate in parallel. For example, the one or more computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 170.

The one or more computing devices 110 can be at various nodes of a network 170 and capable of directly and indirectly communicating with other nodes of network 170. As an example, the one or more computing devices may include one or more web servers that are capable of communicating with storage system 150 as well as computing device 160 in order to test the operation of computing device 160 as described below. Although only a few computing devices are depicted in FIGS. 1-2, it should be appreciated that a typical system can include a large number of connected computing devices, with each different computing device being at a different node of the network 170. The network 170 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As with computing devices 110, computing device 160 may include a single computing device or a plurality of computing devices that together comprise a location data processing system or a back end computing system. Although the location data processing system 160 and one or more server computing devices are depicted as separate and distinct sets of one or more computing devices, for example having different geographical locations, etc., the one or more server computing devices may actually be incorporated into the location data processing system.

The computing devices of the location data processing system 160 may be configured similarly to computing devices 110, having one or more processors and memory as described above. As an example, the location data processing system 160 may include one or more web servers that are capable of communicating with storage system 150 as well as computing devices 110, 120, 130, and 140 via the network. For example, the location data processing system may use network 170 to transmit and present information to a user, such as user 220, 230, or 240, on a display, such as displays 122, 132, or 142 of computing devices 120, 130, or 140. In this regard, computing devices 120, 130, and 140 may be considered client computing devices.

Each of the client computing devices may also be configured similarly to the server computing devices 110, with one or more processors, memory and instructions as described above. Each client computing device 120, 130 or 140 may be a personal computing device intended for use by a user, such as user 220, 230, or 240, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 125 (e.g., a mouse, keyboard, touch-screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

Each client computing device may also include a geographic location device 126 may be used to determine location data, including the geographic location and orientation of the client computing device. For example, client computing device 120 may include a GPS receiver used to determine the device's current geolocation or latitude, longitude, and, in some examples, altitude coordinates. In some examples, the GPS receiver may include its own antenna. Thus, as the client device changes location the client device may use the position component to determine a "new" current location. The current location of the client device may be determined periodically, for example, after a pre-determined update period, such as every minute or several minutes, has passed. In one example, the period may be determined by a timer. Once the timer expires, the period ends, the client device may update geolocation information, and the timer may be restarted. The period may be determined, for example, by the requirements of the application, by the capabilities of the GPS receiver, or by a pre-selected setting of the client device.

The geographic location device 126 may also comprise software for determining the position of the device based on other signals received at the client computing device 120. For example, the geographic location of a cell phone may be determined by identifying one or more cellular tower identifiers ("cellIDs") and requesting the location from a geolocation server based on the cellID. Alternatively, the geographic location of the client device may be determined by triangulating the signals and locations of several cellular towers. In another example, a geographic location may be determined based on identifying nearby wireless network access points as well as respective signal strengths and using this information to request the geolocation information from a server with this information.

In some examples, if a user has selected to do so, a client computing device may report or send the location data from the geographic location device to one or more server computing devices, such as server computing devices 110 or the location data processing system, in order to provide the client computing device with location based services. An individual user location data report sent by a client computing device may thus include information that can be used to identify a geographic location (such as GPS coordinates) from the geographic location device, timestamp information, as well as information identifying the client computing device that reported the user location data. The one or more server computing devices may collect, anonymize, and process the user location data and store it in storage system 150.

As noted above, the storage system 150 may store, inter alia, user location data corresponding to a plurality of user location data reports. As noted above, the individual user location data reports may be anonymized in order to remove any information that could be used to identify any particular user or user's client computing device. Thus, each anonymized user location data report may include location information, and in some examples, timestamp information sent by various client computing devices to one or more server computing devices. In some examples, the user location data may include location data for fictitious users. As an example, the one or more server computing devices 110 may generate and report fictitious user location data in order to test the location data processing system 160 as described below.

In addition to user location data, the storage system 150 may also store one or more location data protocols. An example location data protocol may allow the location data processing system to only process user location data collected at a particular location when that particular location has been visited a threshold minimum number of times. These visits may correspond to individual reports including location data received from various client computing devices. In other words, the storage system 150 must store at least the threshold minimum number of location data corresponding to a particular location reported from one or more client computing devices before the location data processing system 160 can use the user location data in accordance with the protocol. As the user location data is anonymized, the threshold minimum number of reports may or may not be from the same or different client computing devices.

Example Methods

As noted above, user location data is reported by various client computing devices in order to receive various location based services. In situations in which the systems discussed here collect personal information about users, including location data reports, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server, such as one or more of server computing devices 110 or location data processing system 160.

Figure 3:
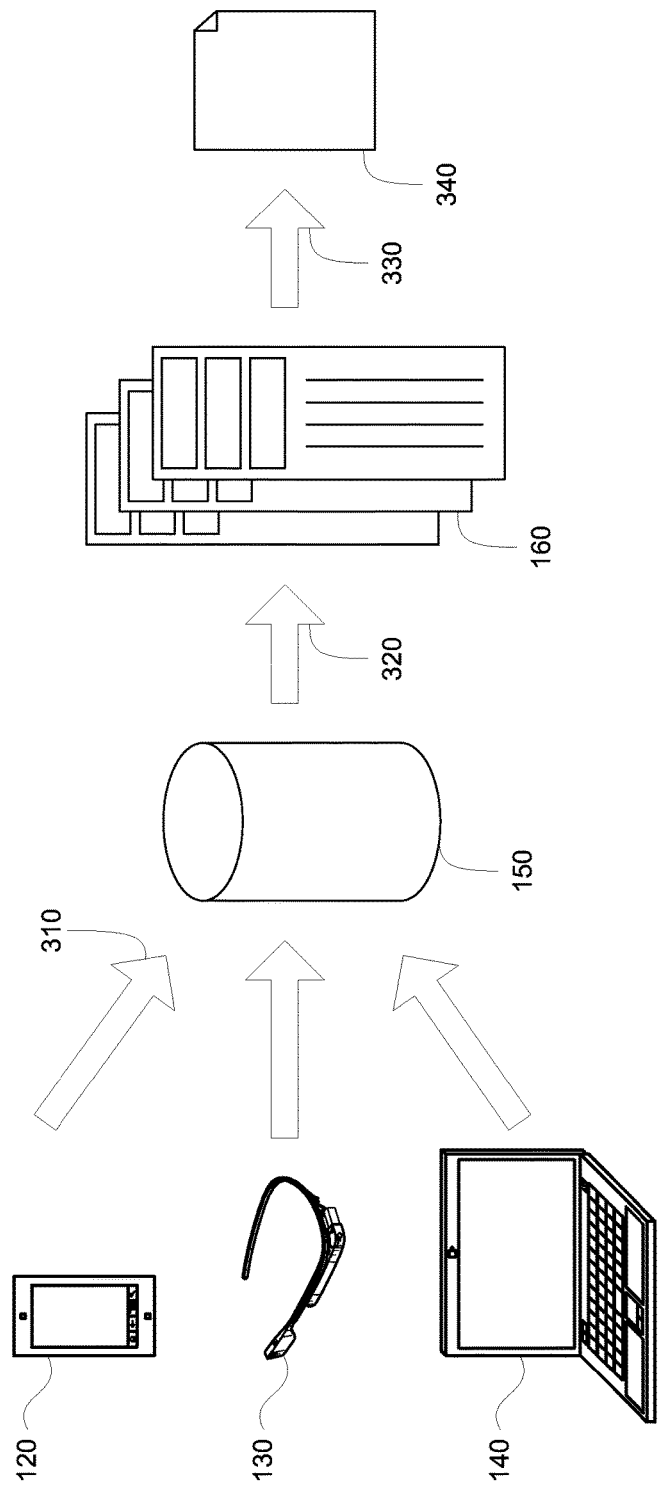
FIG. 3 is an example of the collection, anonymizing, and processing of user location data in accordance with aspects of the disclosure.

FIG. 3 is an example system diagram relating to how user location data may be collected, anonymized, and processed by various back end computing systems in order to improve location based services. In this example, client computing device 120, 130, and 140 generate user location data reports and send them for storage in storage system 150. Arrows 310, 320, and 330 depict the flow of user location data. Before the user location data is stored, it is received by one or more collection and anonymization computing devices (not shown). As an example, the collection and anonymization may be performed by the location data processing system 160 or one or more other server computing devices such as server computing devices 110.

The anonymized user location data is then retrieved from the storage system 150 by the location data processing system 160 for processing in accordance with the user location protocols. As an example, the location data processing system may output one or more output lists 340 including locations as well as other information such as the relative popularity of the locations.

The output of the location data processing system may be tested in order to determine compliance with the user location data protocols. This testing may be performed, for example, prior to the deployment of the location data processing system, where the output of the location data processing system is not yet used to provide location based services to users by way of their client computing devices. In addition, the testing may also be performed while the location data processing system is already in production, where the output of the location data processing system is used to provide location based services to users by way of their client computing devices in order to determine continued compliance with the user location data protocols.

As noted above, the one or more server computing devices 110 may test the compliance with the location data protocols. In one example of a testing scheme, one or more fictitious users and corresponding user location data may be generated. Each fictitious user may include location data which the location data processing system would not readily identify as fictitious. Thus, the user location data may be formatted as if it were reported by an actual client computing device.

The location data generated for the fictitious users may include various locations that a client computing device is likely and unlikely to visit. As an example of an unlikely location, at least one of these locations may be chosen to correspond to a remote or highly unpopular location, or rather, a location where users are unlikely to be providing location data from their mobile computing devices.

Figure 4:
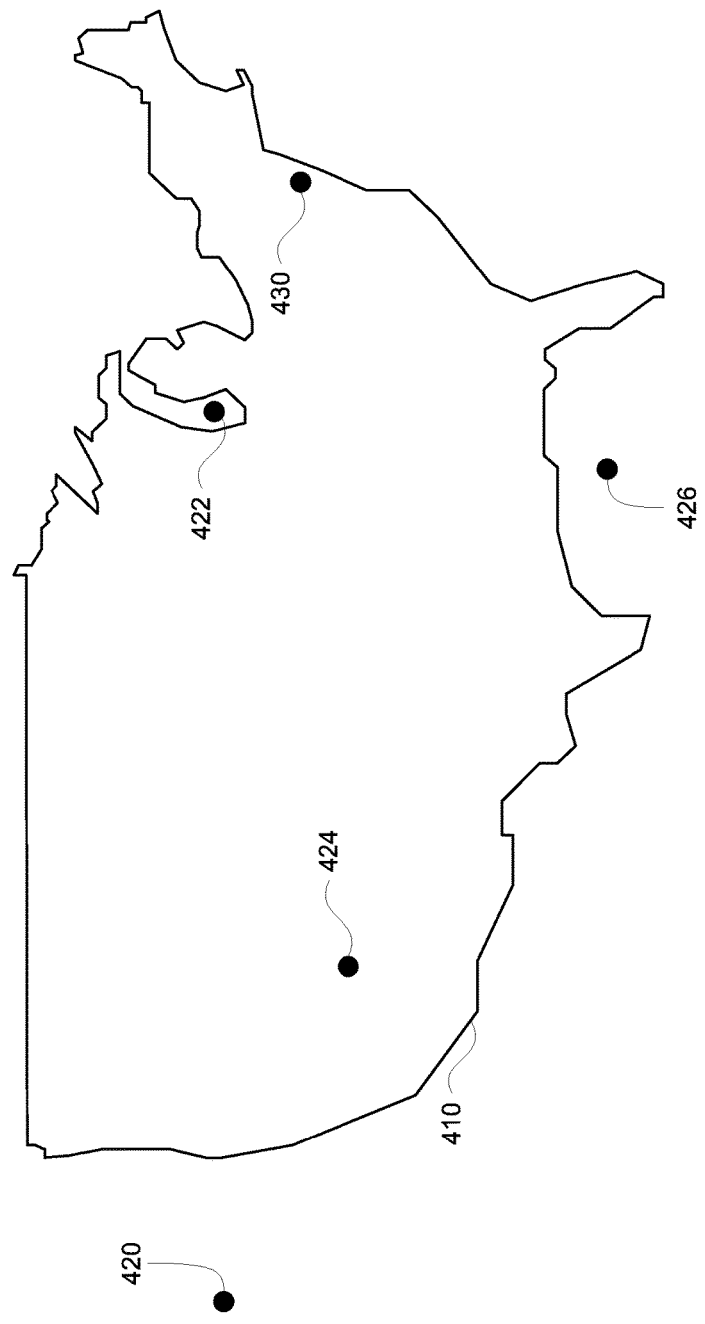
FIG. 4 is an example illustration of various map locations in accordance with aspects of the disclosure.

FIG. 4 is an example illustration 400 of various map locations in and around the United States 410, which may correspond to the location data generated for a particular fictitious user. In this example, locations 420-426 may correspond to examples of remote or highly unpopular locations. In this example, location 420 corresponds to a location in the Pacific Ocean (not corresponding to land), location 422 corresponds to a location in Lake Michigan (not corresponding to land), location 424 corresponds to a location in the Desert National Wildlife Range, and location 426 corresponds to a location in the Gulf of Mexico (not corresponding to land). Each of these locations may be considered remote or unpopular, because even if "real" users were to visit these remote locations and provide location data, it would be very unlikely that there would be enough users to meet the threshold minimum number of location data reports of the protocols described above. As an example, if the threshold minimum number of location data reports is 50, it is unlikely that the locations 420-426 would be reported 50 times (by the same or different client devices) by actual client computing devices. As an example of a non-remote location, location 430 may correspond to a location within New York City, where many more user location data reports than the threshold minimum number of location data reports of the protocols described above are likely to be provided by client computing devices.

Though the examples herein describe the user of only a single fictitious user, any number of fictitious users may be generated. As an example, 50 fictitious users may be generated. It is important that the number of location data reports of the fictitious users that include a particular remote location do not themselves meet the threshold minimum number of location data reports. Thus, if the threshold minimum number of location data reports is 50, the number of location data reports from the fictitious users for any particular remote location should be less than 50. Smaller numbers of fictitious location data reports, for example, on the order of 10 or less, may be in order to avoid the potential for any real client computing devices reporting user location data to put the total number of location data reports over the threshold minimum number of location data reports.

Figure 5:
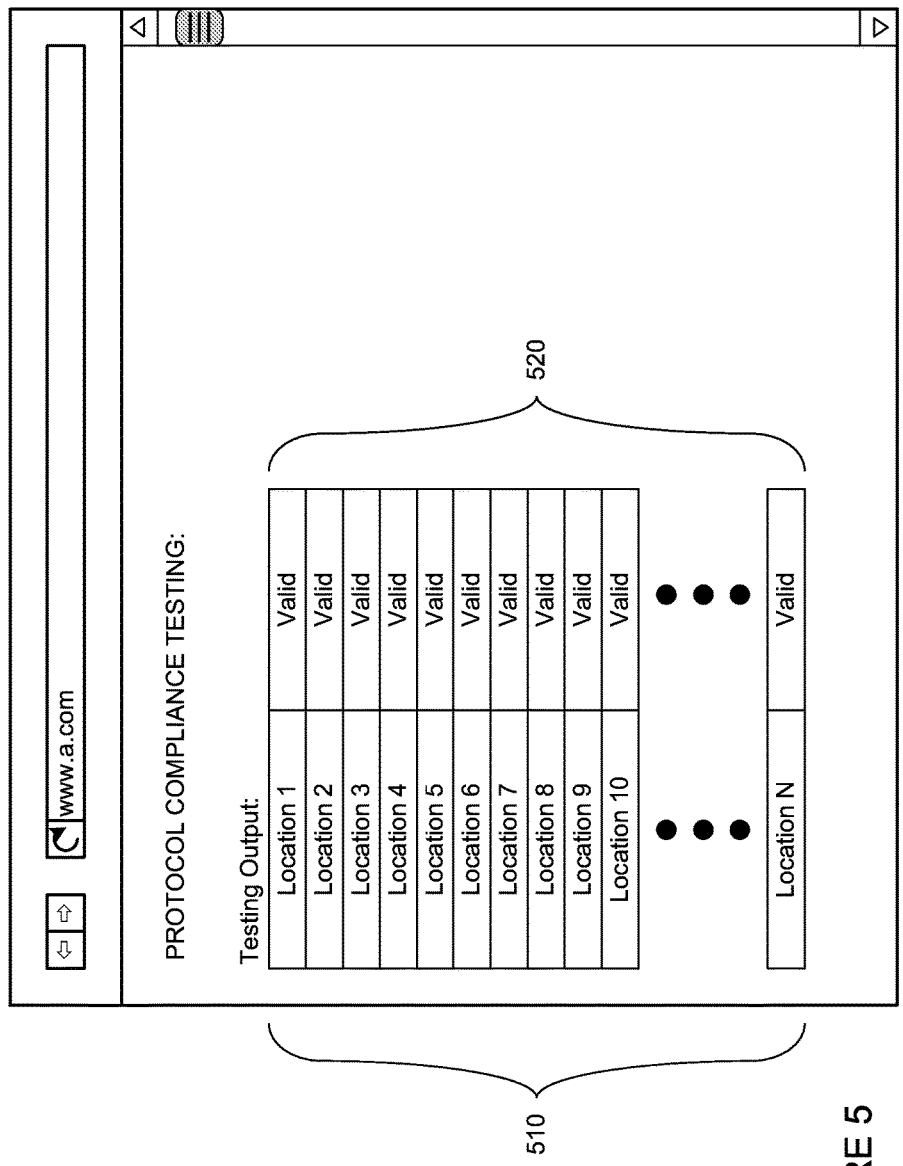
FIG. 5 is an example screen shot in accordance with aspects of the disclosure.

The output from the location data processing system may be processed by one or more computing devices to determine compliance with the location data protocols. For example, the locations of the output lists generated by the location data processing system may then be compared by one or more computing devices, such as computing devices 110, to the remote locations of any generated fictitious users. FIG. 5 is an example screen shot 500 depicting a comparison of a portion 510 of the output lists 340 to one or more remote locations of one or more fictitious users that may be displayed to an administrator of the one or more server computing devices 110. The results of the comparison are listed as comparison results 520 and indicate that each of the locations 1-N of the portion 510 of the output lists 340 are valid or do not overlap with any of the remote locations of the fictitious users. Such displays of the comparison information are not required and the example is included herein for illustration purposes only.

If there are no locations in common, as in the example of FIG. 5, it is likely that the threshold minimum number of location data reports of the location data protocols is being observed. This is because the location data processing system is not likely to be using the location data reports of the fictitious users for remote locations that, even accumulated with other location data reports, would not meet the threshold minimum number of location data reports. However, further testing may be performed on the application to ensure that the location data protocols to test whether the location data protocols are being complied with.

If there is any overlap between the output lists and the remote locations, such as where a remote location is included in both the output list and the location data of a fictitious user, it is highly likely that the location data processing system is using anonymized location data in a way that is contrary to the location data protocols. An overlap between two locations may occur when the locations are identical, for example include the same GPS coordinates, or, as noted above, when the two locations within some reasonable distance of that location such as 10 or 25 meters, etc.

When there is an overlap, the one or more server computing devices may provide various notifications. These notifications may take various forms. As an example, the output of the testing when displayed to an administrator may indicate whether or not there is an overlap. In another example, an electronic message, such as an SMS or email message, may be sent to an administrator. The notification itself may include various information, such as an indication that the location data protocol (and/or threshold minimum number of location data reports) has not been complied with, information identifying the particular overlapping remote location, information identifying any corresponding fictitious users), an indication that further work is required before deploying the location data processing system, etc.

Figure 6:
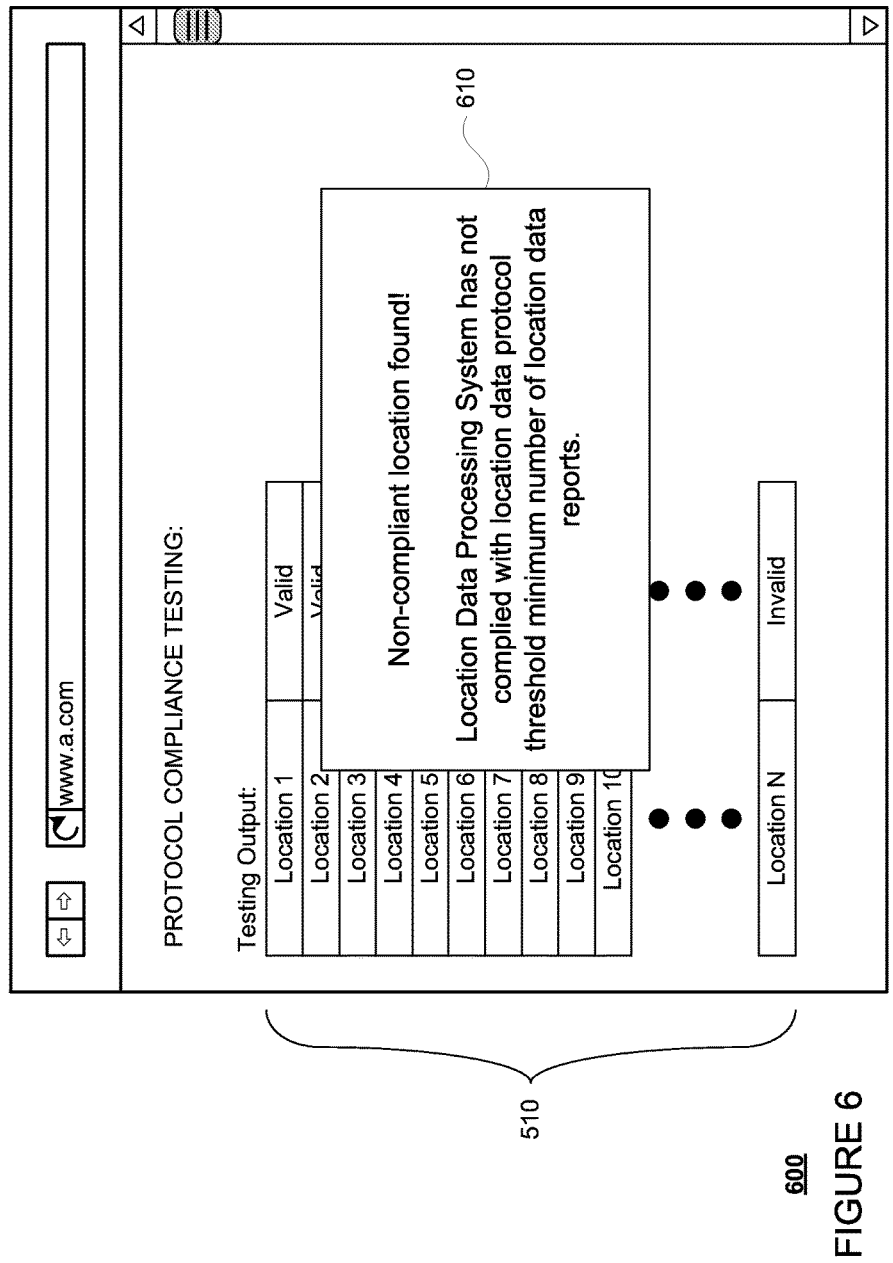
FIG. 6 is another example screen shot in accordance with aspects of the disclosure.

FIG. 6 is another example screen shot 600 depicting a comparison of a portion 510 of the output lists 340 to one or more remote locations of one or more fictitious users and a notification 610 that may be displayed to an administrator of the one or more server computing devices 110. In this example, the result of the comparison of location N is invalid, indicating that location N overlaps with at least one of the remote locations of the fictitious users. As such, a notification 610 indicating that the location data processing system has not complied with location data protocol threshold minimum number of visits. Again, such displays of the comparison information are not required and the example is included herein for illustration purposes only.

If the location data processing system is already in production, and the testing is to ensure continued compliance, it may be important to immediately shut down the location data processing system where there is any overlap in order to protect the privacy of user location data. In this regard, the one or more server computing devices 110 may generate and sent instructions to the location data processing system to stop further processing of user location data immediately. Accordingly, these instructions may cause the location data processing system 160 to stop such processing.

Figure 7:
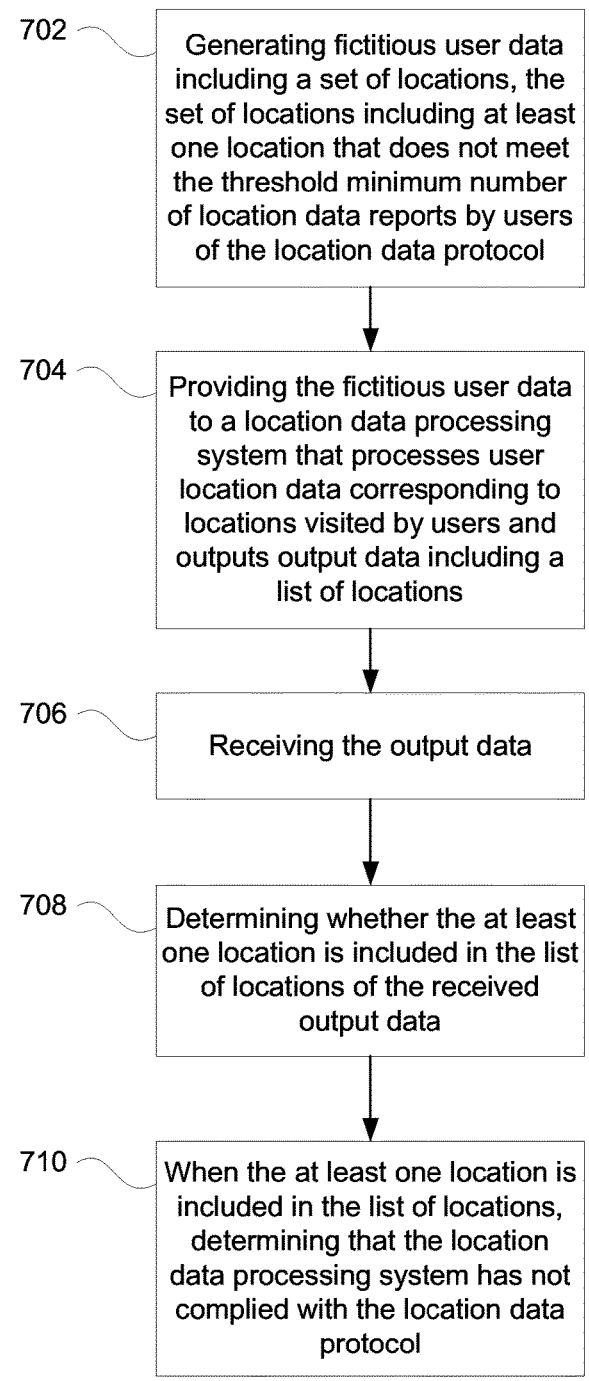
FIG. 7 is a flow diagram related to determining compliance with a location data protocol including a threshold minimum number of location data reports in accordance with aspects of the disclosure.

Flow diagram 700 of FIG. 7 is an example of some of the aspects for determining compliance with a location data protocol including a threshold minimum number of location data reports by users described above which may be performed by one or more computing devices such as the server computing devices 110. In this example, fictitious user data including a set of locations is generated at block 702. The set of locations includes at least one location that does not meet the threshold minimum number of location data reports by users of the location data protocol. The fictitious user data is provided to a location data processing system that processes user location data corresponding to locations visited by users and outputs output data including a list of locations at block 704. The output data is received at block 706. Whether the at least one location is included in the list of locations of the received output data is determined at block 708. When the at least one location is included in the list of locations, it is determined that the location data processing system has not complied with the location data protocol at block 708.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simul-

The invention claimed is:

1. A method for determining compliance with a location data protocol including a threshold minimum number of location data reports by users, the method comprising:
   generating, by one or more computing devices, fictitious user data including a set of locations, the set of locations including at least one location that does not meet the threshold minimum number of location data reports by users of the location data protocol;
   providing, by the one or more computing devices, the fictitious user data to a location data processing system that processes user location data corresponding to locations visited by users and outputs output data including a list of locations;
   receiving, by the one or more computing devices, the output data;
   determining, by the one or more computing devices, whether the at least one location is included in the list of locations of the received output data; and
   when the at least one location is included in the list of locations, determining, by the one or more computing devices, that the location data processing system has not complied with the location data protocol.

2. The method of claim 1, further comprising:
   generating a notification when the at least one location is included in the list of locations indicating that location data processing system has not complied with the protocol; and
   providing the notification for display.

3. The method of claim 1, further comprising sending instructions to the location data processing system to stop further processing of user location data.

4. The method of claim 1, wherein providing the fictitious user data to a location data processing system includes storing the fictitious user data in a storage system with other user location data, the storage system being accessible by the location data processing system.

5. A system for determining compliance with a location data protocol including a threshold minimum number of location data reports by users, the system comprising:
   one or more computing devices including one or more processors, the one or more computing devices being configured to:
      generate fictitious user data including a set of locations, the set of locations including at least one location that does not meet the threshold minimum number of location data reports by users of the location data protocol;
      provide the fictitious user data to a location data processing system that processes user location data corresponding to locations visited by users and outputs output data including a list of locations;
      receive the output data;
      determine whether the at least one location is included in the list of locations of the received output data; and
      when the at least one location is included in the list of locations, determine that the location data processing system has not complied with the location data protocol.

6. The system of claim 5, wherein the one or more computing devices are further configured to:
   generate a notification when the at least one location is included in the list of locations indicating that location data processing system has not complied with the protocol; and
   provide the notification for display.

7. The system of claim 5, wherein the one or more computing devices are further configured to send instructions to the location data processing system to stop further processing of user location data.

8. The system of claim 5, wherein the one or more computing devices are distinct from the location data processing system.

9. The system of claim 5, wherein the one or more computing devices are incorporated into the location data processing system.

10. The system of claim 5, wherein the one or more computing devices are further configured to provide the fictitious user data to a location data processing system by storing the fictitious user data in a storage system with other user location data, the storage system being accessible by the location data processing system.

11. A non-transitory, tangible computer readable medium on which instructions are stored, the instructions, when executed by one or more processors, cause the one or more processors to perform a method for determining compliance with a location data protocol including a threshold minimum number of location data reports by users, the method comprising:
   generating fictitious user data including a set of locations, the set of locations including at least one location that does not meet the threshold minimum number of location data reports by users of the location data protocol;
   providing the fictitious user data to a location data processing system that processes user location data corresponding to locations visited by users and outputs output data including a list of locations;
   receiving the output data;
   determining whether the at least one location is included in the list of locations of the received output data; and
   when the at least one location is included in the list of locations, determining that the location data processing system has not complied with the location data protocol.

12. The medium of claim 11, wherein the method further comprises:
   generating a notification when the at least one location is included in the list of locations indicating that location data processing system has not complied with the protocol; and providing the notification for display.

13. The medium of claim 11, wherein the method further comprises sending instructions to the location data processing system to stop further processing of user location data.

14. The medium of claim 11 wherein providing the fictitious user data to a location data processing system includes storing the fictitious user data in a storage system with other user location data, the storage system being accessible by the location data processing system.

* * * * *